United States Patent
Yamaguchi (10) Patent No.: US 9,660,686 B2
(45) Date of Patent: May 23, 2017

(54) PORTABLE TERMINAL

(71) Applicant: Sharp Kabushiki Kaisha, Sakai-shi, Osaka (JP)

(72) Inventor: Yoshiyuki Yamaguchi, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/110,155

(22) PCT Filed: Jan. 20, 2015

(86) PCT No.: PCT/JP2015/000236
§ 371 (c)(1),
(2) Date: Jul. 7, 2016

(87) PCT Pub. No.: WO2015/118812
PCT Pub. Date: Aug. 13, 2015

(65) Prior Publication Data
US 2016/0352381 A1    Dec. 1, 2016

(30) Foreign Application Priority Data
Feb. 6, 2014 (JP) .................................. 2014-021525

(51) Int. Cl.
| H04B 1/38 | (2015.01) |
| H04B 1/3888 | (2015.01) |
| G06F 1/16 | (2006.01) |
| G06F 1/18 | (2006.01) |
| H04M 1/02 | (2006.01) |
| H04M 1/18 | (2006.01) |

(52) U.S. Cl.
CPC ............. *H04B 1/3888* (2013.01); *G06F 1/16* (2013.01); *G06F 1/18* (2013.01); *H04M 1/026* (2013.01); *H04M 1/0266* (2013.01); *H04M 1/0277* (2013.01); *H04M 1/185* (2013.01)

(58) Field of Classification Search
CPC ........ H04B 1/3888; H04M 1/026; G06F 1/16; G06F 1/18
See application file for complete search history.

(56) References Cited

U.S. PATENT DOCUMENTS

2014/0140021 A1* 5/2014 Malek .................... H05K 1/118
361/751

FOREIGN PATENT DOCUMENTS

| JP | 2010-258821 A | 11/2010 |
| JP | 2010258821 | * 11/2010 |

* cited by examiner

Primary Examiner — Ping Hsieh
(74) Attorney, Agent, or Firm — Keating & Bennett, LLP (57) ABSTRACT

A display unit cabinet has a signal conductor through hole through which a flexible substrate for touch panel and a flexible substrate for liquid crystal that function as signal conductors run in a curved manner such that their ends extend toward a main substrate unit. A portion of a reinforcing sheet metal surrounding a peripheral edge of the signal conductor through hole is bent toward the backside, thereby forming a yet-to-be filled recess. The peripheral edge of the opening is covered with a resin material which is injected to fill the recess during insert molding. The front surface of the reinforcing sheet metal is made continuous with the front surface of the resin material with which the recess is filled.

4 Claims, 7 Drawing Sheets

PORTABLE TERMINAL

TECHNICAL FIELD

The present invention relates to a portable terminal provided with a display unit such as a liquid crystal display.

BACKGROUND ART

Figure 7:
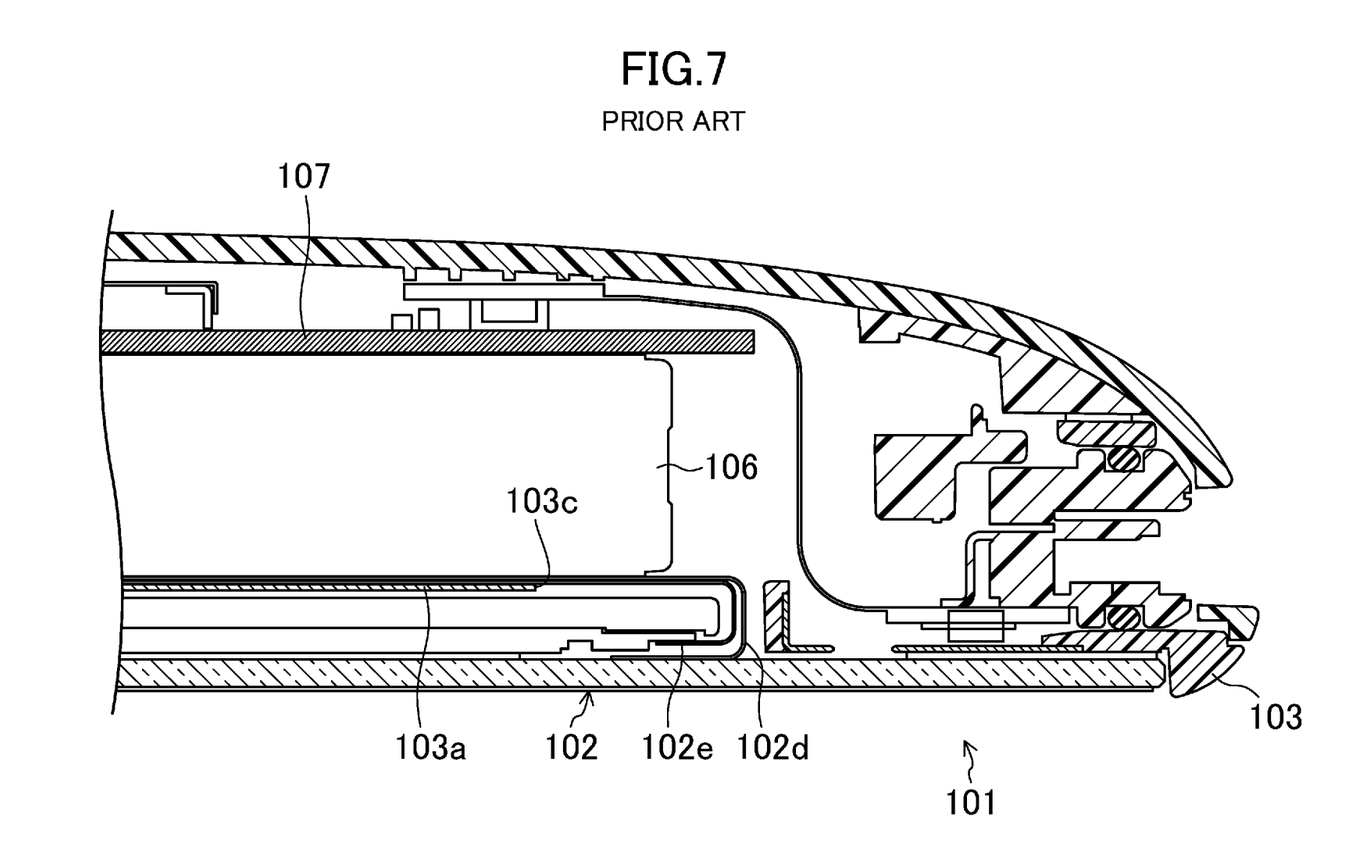
FIG. 7 corresponds to FIG. 1 and shows known art.

A portable terminal 101 as shown in FIG. 7 has been known, in which a display unit cabinet 103 that houses a display unit 102 such as a liquid crystal display is reinforced with a reinforcing frame 103a. This reinforcing frame 103a separates, from the display unit 102, a main substrate 107 and a rechargeable battery 106 that are provided near the backside, thereby protecting the display unit 102. It is recommended that the reinforcing frame 103a have a flat surface to prevent the display unit 102 from having a faint mark which looks like as if something was blotting. To meet a recently increasing demand for reduction in the thickness of the portable terminal 101 such as a mobile telephone, according to a technique, the reinforcing frame 103a is formed out of a sheet metal such as a stainless steel sheet. As shown in FIG. 7, flexible substrates 102d and 102e that extend from the display unit 102 and function as signal conductors need to be bent back and connected to the main substrate 107 through a signal conductor through hole 103c.

As a component for increasing the strength of a sheet metal portion, a shielding case described in Patent Document 1 has been known, for example. This shielding case has a recess formed by inwardly recessing its outer surface such that the recess comes into contact with, or close to, an electronic component. This recess is filled with a resin material, thereby making the outer surface substantially flat.

CITATION LIST

Patent Document

Patent Document 1: Japanese Unexamined Patent Publication No. 2010-258821

SUMMARY OF THE INVENTION

Technical Problem

As shown in FIG. 7, however, in the portable terminal 101 of the known art, the sheet metal functioning as the reinforcing frame 103a forms the peripheral edge of the signal conductor through hole 103c. Therefore, the flexible substrates 102d and 102e may come into contact with the sheet metal and be damaged. For this reason, the signal conductor through hole 103c needs to be large enough to prevent the flexible substrates 102d and 102e from coming into contact with the edge of the sheet metal. Consequently, the strength decreases at a portion surrounding the peripheral edge of the signal conductor through hole 103c, and the reinforcing frame 103a becomes less effective at protecting the display unit 102. In particular, stress tends to concentrate at the corner portions defining the signal conductor through hole 103c. If special measures, such as covering the sharp edge of the sheet metal with a sheet, are taken, the number of the components and the number of boding process steps will increase disadvantageously. The flexible substrates 102d and 102e need to be bent at an acute angle near the thin sheet metal portion, which may cause an inconvenience such as breakage of the flexible substrates 102d and 102e.

On the other hand, the technique of Patent Document 1 simply increases the strength of the shielding case by filling the recess with resin, and is not capable of preventing damage to be done to signal conductors.

In view of the foregoing, it is therefore an object of the present invention to achieve, with a simple structure, improvement of the strength of a portion surrounding the peripheral edge of a signal conductor through hole and minimization of damage to be done to a signal conductor which runs through the signal conductor through hole.

Solution to the Problem

To achieve this object, according to the present invention, a yet-to-be filled recess is provided in a portion of a reinforcing sheet metal that surrounds a peripheral edge of a signal conductor through hole, and this recess is filled with a resin material such that the front surface becomes flat.

Specifically, the present invention is implemented as a portable terminal provided with a display unit. The portable terminal includes:

a display unit cabinet including a reinforcing sheet metal which has been provided by insert molding so as to be arranged close to a backside of the display unit;

a signal conductor extending from the display unit toward a backside of the portable terminal;

a main substrate arranged close to a backside of the reinforcing sheet metal; and a signal conductor through hole which is formed in the display unit cabinet and through which the signal conductor runs in a curved manner such that a tip end of the signal conductor extends toward the main substrate, wherein a portion of the reinforcing sheet metal surrounding a peripheral edge of the signal conductor through hole is bent toward the backside of the portable terminal, thereby forming a yet-to-be filled recess, the peripheral edge of the signal conductor through hole is covered with a resin material injected to fill the recess during the insert molding, and a front surface of the reinforcing sheet metal is continuous with a front surface of the resin material with which the recess is filled.

With this configuration, since the peripheral edge of the signal conductor through hole in the reinforcing sheet metal is covered with the resin material with which the recess is filled, the portion surrounding the peripheral edge of the signal conductor through hole may be thick enough to increase its own strength. Making the front surface of the reinforcing sheet metal continuous with the front surface of the resin material with which the recess is filled may reduce adverse influence which the presence of level difference could exert on the display unit. The peripheral edge of the signal conductor through hole has an increased thickness, which eliminates the need for the signal conductor to be bent so as to have a small bend radius, thereby avoiding an unnecessary increase in the size of the signal conductor through hole. In addition, since the signal conductor is not in direct contact with an end surface of the reinforcing sheet metal, the signal conductor is subject to damage less easily.

Advantages of the Invention

As can be seen from the foregoing, according to the present invention, a portion of the reinforcing sheet metal surrounding a peripheral edge of a signal conductor through hole is bent toward the backside of the portable terminal, thereby forming a yet-to-be filled recess. The peripheral edge of the signal conductor through hole is covered with a resin material injected to fill the recess during insert molding, and a front surface of the reinforcing sheet metal is made to be continuous with a front surface of the resin material with which the recess is filled. As a result, the present invention may achieve, with a simple structure, improvement of the strength of the portion surrounding the peripheral edge of the signal conductor through hole and minimization of the damage to be done to the signal conductor that runs through the signal conductor through hole.

DESCRIPTION OF EMBODIMENTS

Embodiments of the present invention will be described below with reference to the drawings.

(First Embodiment)

Figure 1:
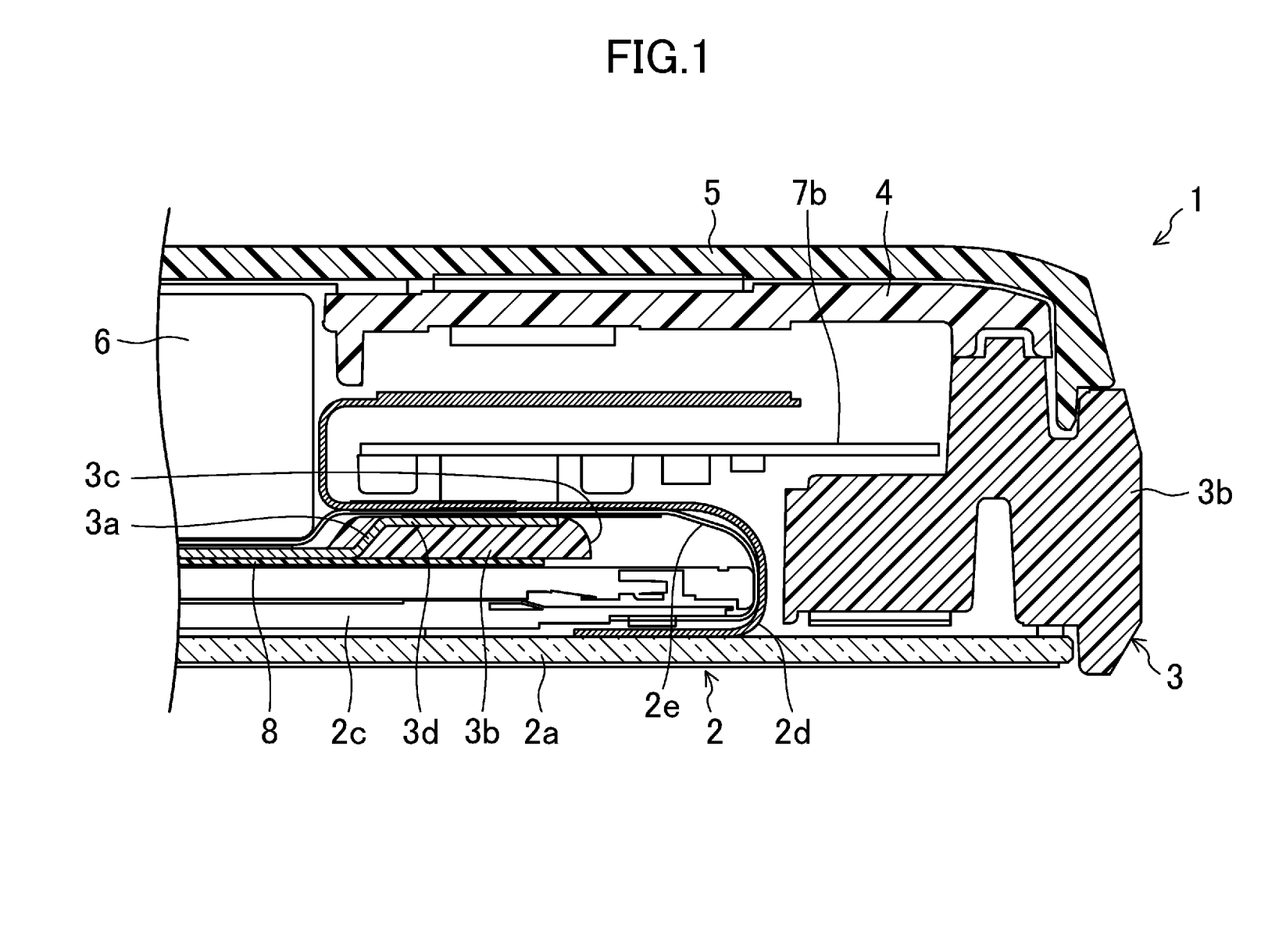
FIG. 1 shows, on an enlarged scale, a cross section taken along the plane I-I in FIG. 2A.
Figure 2A:
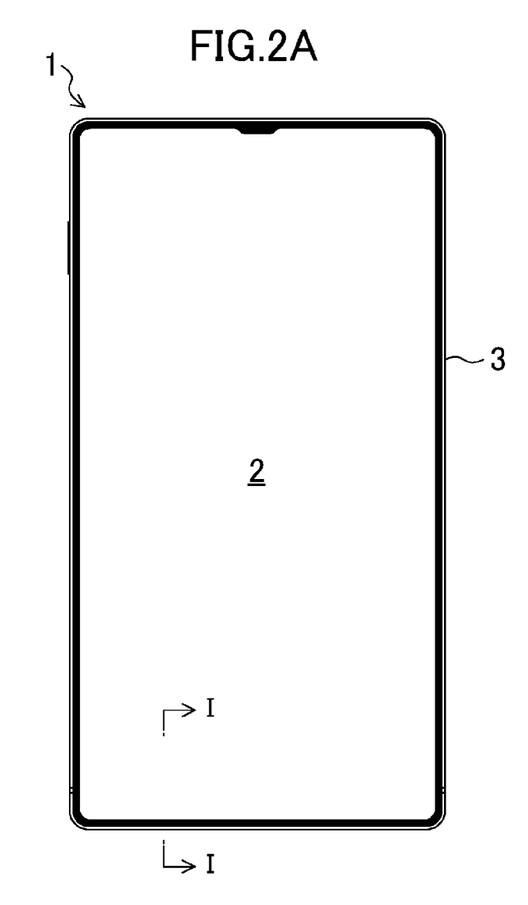
FIG. 2A is a front view showing a mobile telephone according to a first embodiment of the present invention.
Figure 2B:
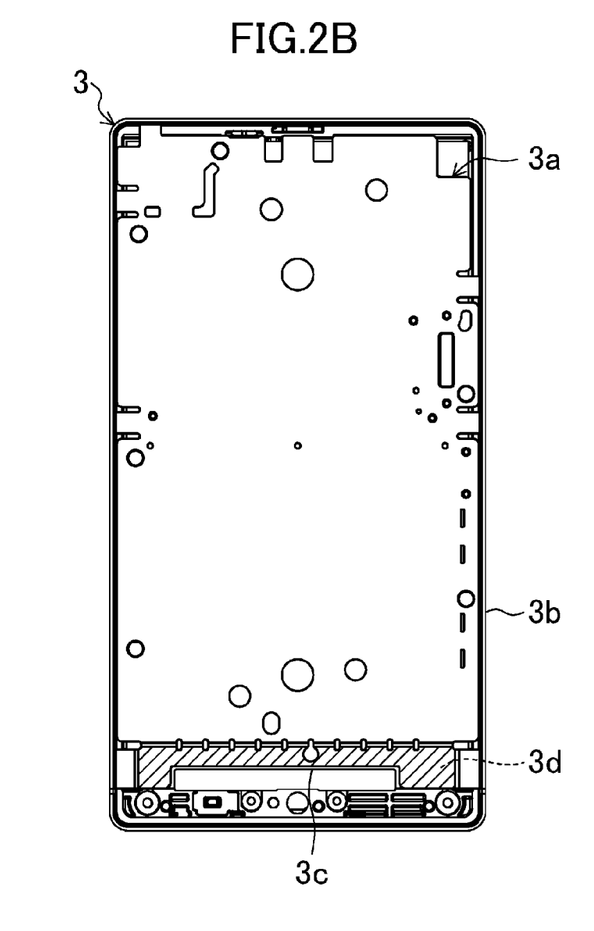
FIG. 2B is a front view showing a display unit cabinet according to the first embodiment of the present invention.
Figure 3:
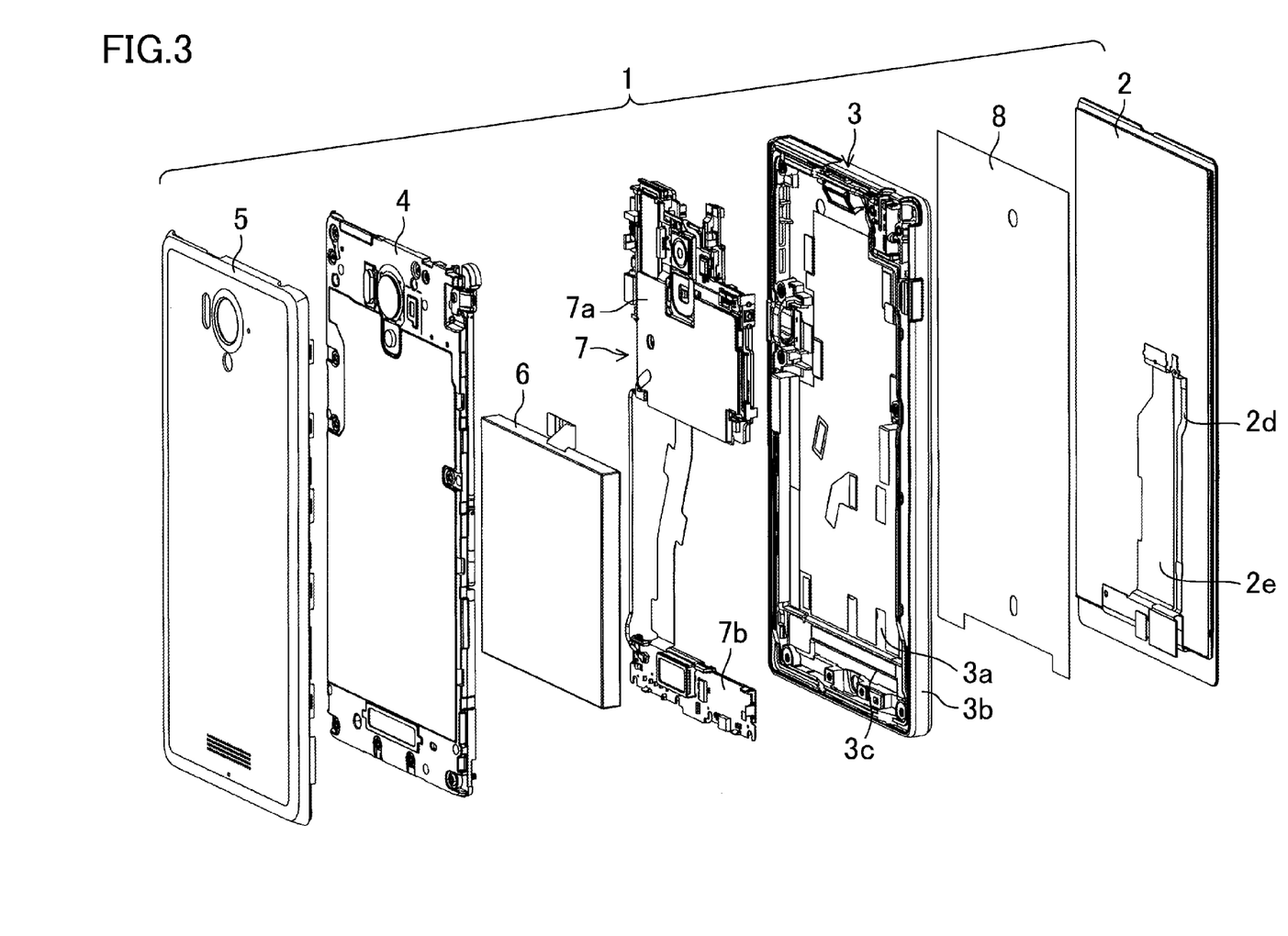
FIG. 3 is an exploded perspective view of the mobile telephone.

FIGS. 1-3 show a mobile telephone 1 as an exemplary portable terminal according to a first embodiment of the present invention. The mobile telephone 1 includes a display unit cabinet 3 which houses therein a display unit 2 including, for example, a touch panel and a liquid crystal display, a backside cabinet 4 coupled to the backside of the display unit cabinet 3, and a rear cover 5 covering the backside of the backside cabinet 4. The display unit 2 includes a cover glass 2a and a liquid crystal unit 2c. (Note that although the cover glass 2a of this embodiment includes the touch panel, the touch panel may be provided separately from the cover glass 2a.) A flexible substrate 2d for touch panel extends from the touch panel, and a flexible substrate 2e for liquid crystal extends from the liquid crystal unit 2c.

A housing space is provided between the display unit cabinet 3 and the backside cabinet 4 in order to house a rechargeable battery 6 having a rectangular plate shape and a main substrate unit 7, for example. A cushion sheet 8 for preventing a faint mark (or pooling), which looks like as if something is blotting, of the liquid crystal is bonded to the backside of the display unit 2. This cushion sheet 8, however, may be omitted. The flexible substrate 2d for touch panel and the flexible substrate 2e for liquid crystal function as signal conductors which electrically connect the display unit 2 to the main substrate unit 7. The main substrate unit 7 includes, for example, a main substrate 7a and a sub-substrate 7b which is provided below and spaced from the main substrate 7a.

In this embodiment, a reinforcing sheet metal 3a having a rectangular plate shape and to be arranged close to the backside of the display unit 2 in the display unit cabinet 3 is provided by insert molding, together with a resin material 3b which is formed in a rectangular frame shape. As shown in FIG. 2B, the reinforcing sheet metal 3a has been formed by punching, bending, and drawing a rectangular thin plate of stainless steel through pressing.

Figure 4:
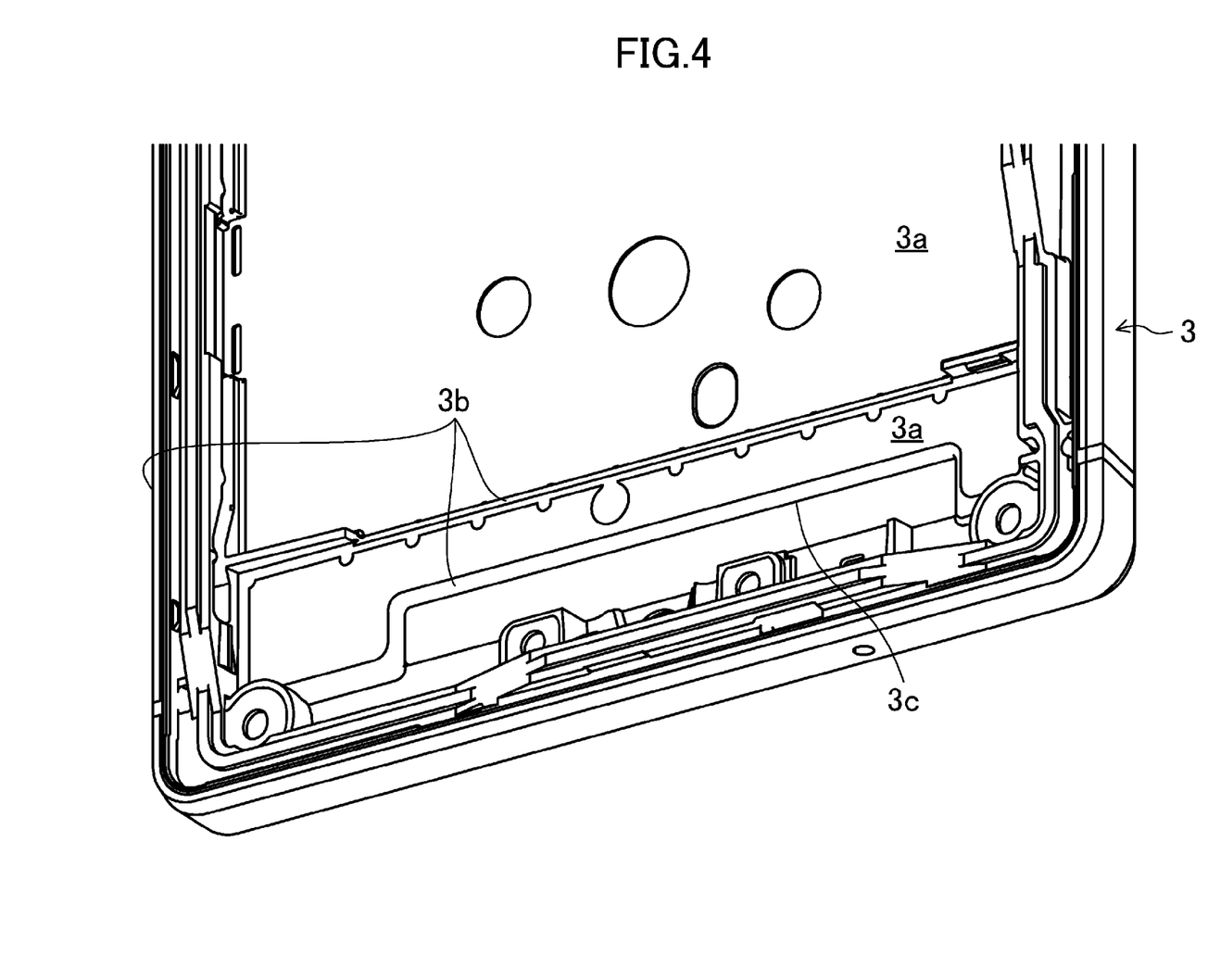
FIG. 4 is a perspective view which shows, on an enlarged scale, a signal conductor through hole formed in a display unit cabinet and an area surrounding the opening.

As shown in FIG. 4, the display unit cabinet 3 has, in its lower meddle portion, a signal conductor through hole 3c which has a rectangular shape in a front view, for example. The flexible substrate 2d for touch panel and the flexible substrate 2e for liquid crystal run in a curved manner through the signal conductor through hole 3c such that their tip ends extend toward the main substrate unit 7.

As shown in FIG. 1 on an enlarged scale, a portion of the reinforcing sheet metal 3a surrounding the peripheral edge of the signal conductor through hole 3c is bent toward the backside, thereby forming a yet-to-be filled recess 3d (which corresponds to the hatched region in FIG. 2B). For example, this yet-to-be filled recess 3d is formed to surround continuously a horizontal side and left and right vertical sides of the signal conductor through hole 3c shown in FIG. 2B. In particular, to prevent stress concentration at its corner portions, it is recommended that the yet-to-be filled recess 3d be continuous at least at and around its corner portions. The yet-to-be filled recess 3d facing the front is filled with the resin material 3b injected during the insert molding of the display unit cabinet 3. The front surface of the resin material 3b with which the recess 3d is filled and the front surface of the reinforcing sheet metal 3a are at substantially the same level relative to the bottom of the recess and continuous with each other. It is recommended that the level difference at the boundary between the resin material 3b and the reinforcing sheet metal 3a be small enough to avoid appearance of the faint mark in the liquid crystal when force is applied to the display unit 2.

As shown in FIG. 1, by the insert molding, the peripheral edge of the signal conductor through hole 3c is covered with the resin material 3b that comes to have a curved surface, resulting in that the peripheral edge has a highly rounded shape. A side face of the rechargeable battery 6 partially overlaps with a sidewall of the recess 3d in a side view (i.e., when viewed from the right side in FIG. 1). In other words, the rechargeable battery 6 and the recess 3d are arranged such that the recess 3d is not overlapped by a lower portion of the rechargeable battery 6, when viewed from the backside.

As can be seen from the foregoing description, since the portion of the reinforcing sheet metal 3a surrounding the peripheral edge of the signal conductor through hole 3c is covered with the resin material 3b with which the recess 3d is filled, the portion surrounding the peripheral edge of the signal conductor through hole 3c may be thick enough to increase its strength. As a result, the chances of cracks occurring in the display unit 2, which affects the reliability of the mobile telephone 1, may be reduced, for example.

Further, making the front surface of the reinforcing sheet metal 3a continuous with the front surface of the resin material 3b with which the recess 3d is filled may reduce adverse influence such as the faint mark which the presence of level difference could exert on the display unit 2.

The peripheral edge of the signal conductor through hole 3c has an increased thickness, which eliminates the need for the flexible substrate 2d for touch panel and the flexible substrate 2e for liquid crystal to be bent so as to have a small bend radius. Thus, there is no need to expand the signal conductor through hole 3c excessively, and consequently, a decrease in the strength may be avoided effectively.

Beside, since the flexible substrate 2d for touch panel and the flexible substrate 2e for liquid crystal are not in direct contact with the end surface of the reinforcing sheet metal 3a, they are less easily damaged. In addition, covering the peripheral edge of the signal conductor through hole 3c with the resin material 3b having a curved surface may even more effectively reduce the damage to be done to the flexible substrate 2d for touch panel and the flexible substrate 2e for liquid crystal.

Furthermore, the rechargeable battery 6 that is thicker than any other component and the recess 3d that has its thickness increased by being filled with the resin material 3b are arranged at mutually different levels so as not to overlap with each other in a front view. This arrangement may lead to a decrease in the total thickness of the mobile telephone 1.

Thus, the mobile telephone 1 of this embodiment may achieve, with a simple structure, improvement of the strength of the portion surrounding the peripheral edge the signal conductor through hole 3c and minimization of the damage to be done to the flexible substrate 2d for touch panel and the flexible substrate 2e for liquid crystal that run through the signal conductor through hole 3c.

(Second Embodiment)

Figure 5:
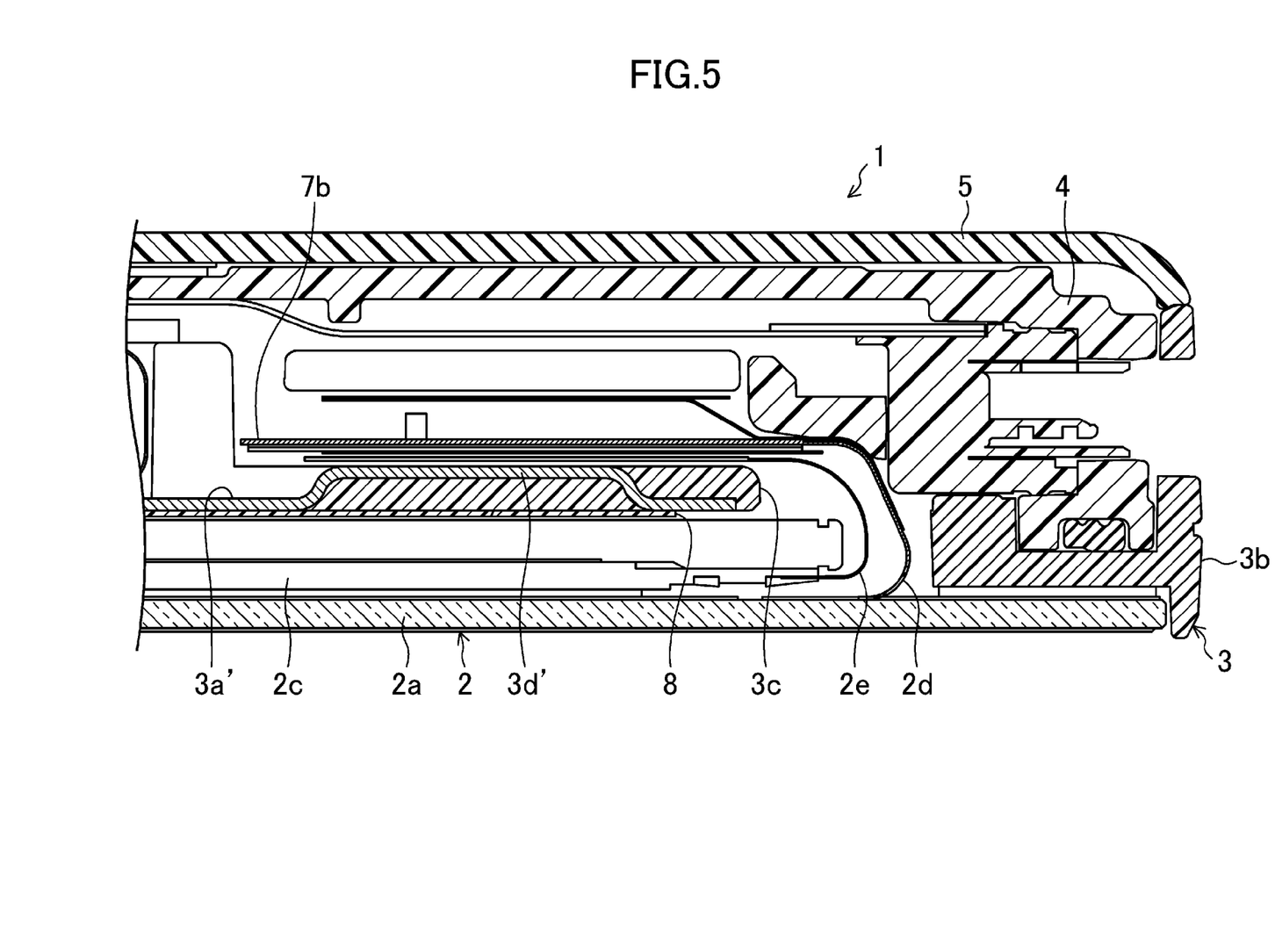
FIG. 5 corresponds to FIG. 1 and shows a second embodiment of the present invention.

FIG. 5 shows a second embodiment of the present invention. The second embodiment has a yet-to-be filled recess 3d' which is formed at a different position from the counterpart of the first embodiment. In the following embodiments, components that are the same as those shown in FIGS. 1-4 will be identified by the corresponding reference characters, and detailed description thereof will be omitted herein.

Specifically, as shown in FIG. 5, the yet-to-be filled recess 3d' of this embodiment does not have an open end facing the signal conductor through hole 3c, but has an end portion which is bent again toward the front side near the signal conductor through hole 3c. That is to say, in a front view, the recess 3d' is slightly spaced from the signal conductor through hole 3c and extends continuously. While the front surface of the end portion of the reinforcing sheet metal 3a' that is located close to the signal conductor through hole 3c is exposed, the peripheral edge of the signal conductor through hole 3c is suitably covered with the resin material 3b.

Like the first embodiment, this configuration may achieve, with a simple structure, improvement of the strength of the portion surrounding the peripheral edge of the signal conductor through hole 3c and minimization of the damage to be done to the flexible substrate 2d for touch panel and the flexible substrate 2e for liquid crystal that run through the signal conductor through hole 3c.

(Third Embodiment)

Figure 6:
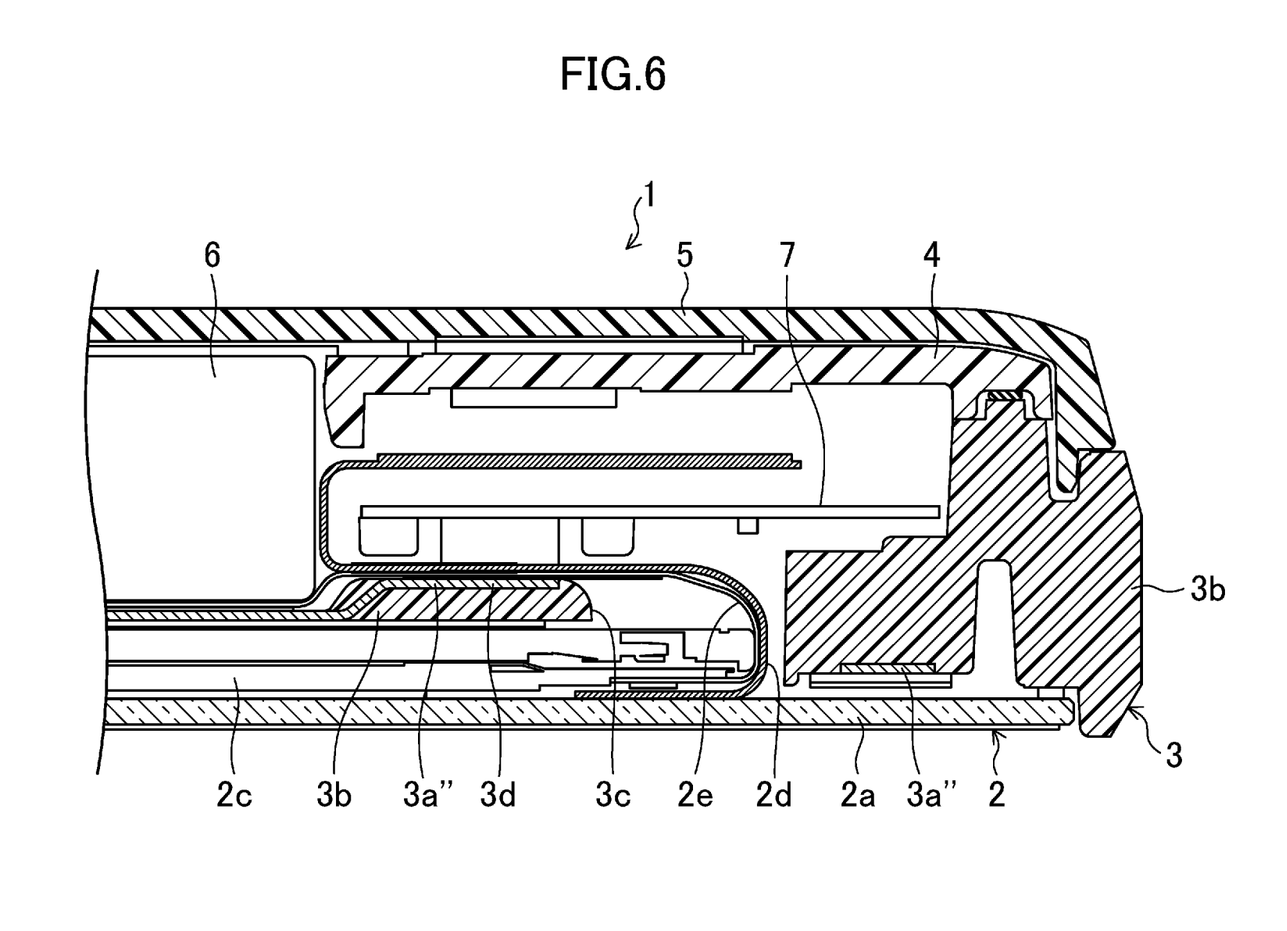
FIG. 6 corresponds to FIG. 1 and shows a third embodiment of the present invention.

FIG. 6 shows a third embodiment of the present invention. In the third embodiment, the signal conductor through hole 3c that is formed in the reinforcing sheet metal 3a" has a different shape from those of the first and second embodiments.

Specifically, in this embodiment, the lower side of the signal conductor through hole 3c is also constituted by the reinforcing sheet metal 3a". In other words, the reinforcing sheet metal 3a" has a rectangular opening formed therein, instead of a cut-out portion.

In this configuration, almost the entire peripheral edge (i.e., all of the four sides) of the signal conductor through hole 3c is constituted by the ends of the reinforcing sheet metal 3a". Each of the ends constituting the peripheral edge is covered with the resin material 3b, and is not in contact with the flexible substrate 2d for touch panel or the flexible substrate 2e for liquid crystal.

The yet-to-be filled recess 3d is formed to extend along all of those ends of the reinforcing sheet metal 3a" but its lower side, and this recess 3d is filled with the resin material 3b.

This embodiment may also achieve, with a simple structure, improvement of the strength of the portion surrounding the peripheral edge of the signal conductor through hole 3c and minimization of the damage to be done to the flexible substrate 2d for touch panel and the flexible substrate 2e for liquid crystal that run through the signal conductor through hole 3c.

(Other Embodiments)

The embodiments of the present invention described above may be modified as follows.

The signal conductor through hole 3c, which has a rectangular shape in a front view in each of the above embodiments, may also have a different shape, such as a semielliptical shape or a semicircular shape.

In the embodiments described above, the portable terminal is configured as the mobile telephone 1. However, the portable terminal may also be configured as a tablet terminal, a PHS (Personal Handy-phone System), a PDA (Personal Digital Assistant), a PC, a mobile tool, an electronic dictionary, a calculator, a game console, or any other electronic device.

Note that the embodiments described above are merely preferred examples in nature, and are not intended to limit the scope, application, or uses of the present invention. The technical features specified in the foregoing description of the embodiments may be combined with each other, and such a combination may create a new technical feature.

DESCRIPTION OF REFERENCE CHARACTERS

1 Mobile telephone (Portable Terminal)
2 Display unit
2a Cover Glass
2c Liquid Crystal Unit
2d Flexible Substrate for Touch Panel (Signal Conductor)
2e Flexible Substrate for Liquid Crystal (Signal Conductor)
3 Display unit Cabinet
3a, 3a', 3a" Reinforcing Sheet Metal
3b Resin Material
3c Signal Conductor Through Hole
3d, 3d' Yet-to-be Filled Recess
4 Backside Cabinet
5 Rear Cover
6 Rechargeable Battery
7 Main Substrate Unit
8 Cushion Sheet

The invention claimed is:

1. A portable terminal provided with a display unit, the portable terminal comprising:
   a display unit cabinet including a reinforcing sheet metal which has been provided by insert molding so as to be arranged close to a backside of the display unit;
   a signal conductor extending from the display unit toward a backside of the portable terminal;
   a main substrate arranged close to a backside of the reinforcing sheet metal; and
   a signal conductor through hole which is formed in the display unit cabinet and through which the signal conductor runs in a curved manner such that a tip end of the signal conductor extends toward the main substrate, wherein
   a portion of the reinforcing sheet metal surrounding a peripheral edge of the signal conductor through hole is bent toward the backside of the portable terminal, thereby forming a yet-to-be filled recess, the peripheral edge of the signal conductor through hole is covered with a resin material injected to fill the recess during the insert molding, and a front surface of the reinforcing sheet metal is continuous with a front surface of the resin material with which the recess is filled.

2. The portable terminal of claim 1, wherein
the resin material covering the peripheral edge of the signal conductor through hole has a curved surface.

3. The portable terminal of claim 2, further comprising:
a rechargeable battery, wherein
in a side view, a side face of the rechargeable battery partially overlaps with a sidewall of the recess.

4. The portable terminal of claim 1, further comprising:
a rechargeable battery, wherein
in a side view, a side face of the rechargeable battery partially overlaps with a sidewall of the recess.

* * * * *